United States Patent
Wu (10) Patent No.: US 12,219,679 B2
(45) Date of Patent: Feb. 4, 2025

(54) LIGHTING CONTROL METHOD, CONTROL SYSTEM AND STORAGE MEDIUM

(71) Applicant: SMART LIGHTING HOLDING LIMITED, Kowloon Bay KL (CN)

(72) Inventor: Ji Wu, Kowloon Bay KL (CN)

(73) Assignee: SMART LIGHTING HOLDING LIMITED, Kowloon Bay KL (CN)

( * ) Notice: Subject to any disclaimer, the term of this patent is extended or adjusted under 35 U.S.C. 154(b) by 0 days.

(21) Appl. No.: 18/015,517

(22) PCT Filed: Sep. 30, 2022

(86) PCT No.: PCT/CN2022/123449
§ 371 (c)(1),
(2) Date: Jan. 10, 2023

(87) PCT Pub. No.: WO2024/027010
PCT Pub. Date: Feb. 8, 2024

(65) Prior Publication Data
US 2024/0276618 A1  Aug. 15, 2024

(30) Foreign Application Priority Data
Aug. 1, 2022 (CN) .......................... 202210917622.5

(51) Int. Cl.
*H05B 47/105* (2020.01)
*H05B 47/175* (2020.01)
*G06V 40/16* (2022.01)
*G06V 40/20* (2022.01)
*G10L 25/63* (2013.01)

(52) U.S. Cl.
CPC ......... *H05B 47/105* (2020.01); *H05B 47/196* (2024.01); *G06V 40/174* (2022.01); *G06V 40/20* (2022.01); *G10L 25/63* (2013.01)

(58) Field of Classification Search
None
See application file for complete search history.

(56) References Cited

U.S. PATENT DOCUMENTS

| 11,961,410 | B1 * | 4/2024 | Lin | G06N 20/00 |
| 2019/0364644 | A1 * | 11/2019 | Vangeel | H05B 47/115 |
| 2020/0060007 | A1 * | 2/2020 | Harrison | G06F 18/22 |
| 2021/0348734 | A1 * | 11/2021 | Bertken | F21V 14/02 |
| 2022/0203996 | A1 * | 6/2022 | Katz | B60W 50/14 |

(Continued)

*Primary Examiner* — Wilson Lee
(74) *Attorney, Agent, or Firm* — Farjami & Farjami LLP (57) ABSTRACT

Disclosed are a lighting control method, a control system and a storage medium. The method includes: acquiring a user behavior representing a user emotion; inputting the user behavior into an emotion prediction network for prediction to obtain a user emotion classification result, where the emotion prediction network is obtained by training through an algorithm based on an attention mechanism; and generating a control instruction according to the emotion classification result, where the control instruction is used for modulating a lighting mode of at least one lamp device. According to the disclosure, the user emotion classification result is obtained by analyzing and predicting the user behavior, the control instruction is generated according to the emotion classification result, and the control instruction is used for controlling the preset lighting mode of the lamp device.

15 Claims, 4 Drawing Sheets

(56) References Cited

U.S. PATENT DOCUMENTS

| | | | |
|---|---|---|---|
| 2023/0225031 A1* | 7/2023 | Lin | H05B 47/11 |
| | | | 362/276 |
| 2023/0410378 A1* | 12/2023 | Karmi | A63F 13/55 |
| 2024/0046702 A1* | 2/2024 | Han | G06V 10/761 |
| 2024/0098859 A1* | 3/2024 | Pandharipande | H05B 45/20 |

* cited by examiner

LIGHTING CONTROL METHOD, CONTROL SYSTEM AND STORAGE MEDIUM

TECHNICAL FIELD

The present disclosure relates to the field of lighting control, and more particularly, to a lighting control method, a control system and a storage medium.

BACKGROUND

With the continuous development of science and technology, people's living standard has also been improved correspondingly. For lighting lamp devices, in order to meet a plurality of requirements for different scenarios, it is common to set a variety of switchable lighting modes for the lighting lamps, so that users can switch the lighting modes of the lighting lamp devices according to use demands to meet the requirement of the corresponding scenario. However, in the related art, most lamp devices have to be actively switched by users to adapt to the requirement of the scenario, and the operation of lighting control is tedious, so it is difficult for the users to quickly switch the lamp devices to the required lighting mode, which affects the user experience.

SUMMARY

An embodiment according to a first aspect of the present disclosure provides a lighting control method, including: acquiring a user behavior representing a user emotion; inputting the user behavior into an emotion prediction network for prediction to obtain a user emotion classification result, where the emotion prediction network is obtained by training through an algorithm based on an attention mechanism; and generating a control instruction according to the emotion classification result, where the control instruction is used for modulating a lighting mode of at least one lamp device.

According to some embodiments of the first aspect of the present disclosure, the user behavior is user voice data, user emotional-expression data, or user gesture data.

According to some embodiments of the first aspect of the present disclosure, inputting the user behavior into the emotion prediction network for prediction to obtain the user emotion classification result includes: inputting the user behavior into an emotion extraction model to extract emotion features to obtain implied emotion features, where the emotion extraction model is obtained by training through an algorithm based on a self-attention mechanism; and inputting the implied emotion features into a multilayer perceptron to obtain the user emotion classification result.

According to some embodiments of the first aspect of the present disclosure, generating the control instruction according to the emotion classification result includes: determining the emotion classification result according to a preset special emotion set; and when the emotion classification result belongs to the special emotion set, inputting the emotion classification result into a lighting prediction model for lighting prediction to obtain the control instruction.

According to some embodiments of the first aspect of the present disclosure, after determining the emotion classification result according to the preset special emotion set, the method further includes: when the emotion classification result does not belong to the special emotion set, inputting a historical control instruction into a preference extraction model to extract preference features to obtain implied preference features, where the preference extraction model is obtained by training through an algorithm based on a self-attention mechanism; and inputting the implied preference features into a preference prediction model for preference prediction to obtain the control instruction.

An embodiment according to a second aspect of the present disclosure provides a lighting control system, including: an analysis system including a mobile terminal and a specific cloud connected with each other, the mobile terminal being configured to receive a user behavior and send the user behavior to the specific cloud, the specific cloud being configured to input the received user behavior into an emotion prediction network for prediction to obtain an emotion classification result, generate a control instruction according to the emotion classification result and send the control instruction to the mobile terminal, and the mobile terminal being also configured to send the control instruction, where the user behavior is used for representing a user emotion, and the emotion prediction network is obtained by training through an algorithm based on an attention mechanism; and a lamp device connected with the mobile terminal, where the lighting modes of the lamp device may be modulated arbitrarily, and the lamp device is configured to receive the control instruction from the mobile terminal and control the lighting mode according to the control instruction.

According to some embodiments of the second aspect of the present disclosure, the mobile terminal is respectively connected with the specific cloud and the lamp device by means of telecommunication.

An embodiment according to a third aspect of the present disclosure provides a lighting control system, including: an analysis system including a mobile terminal, a specific cloud and a router, the mobile terminal being connected with the router, the router being connected with the specific cloud, the mobile terminal being configured to receive a user behavior and send the user behavior to the router, the router being configured to send the user behavior to the specific cloud, the specific cloud being configured to input the received user behavior into an emotion prediction network for prediction to obtain an emotion classification result, generate a control instruction according to the emotion classification result and send the control instruction to the router, and the router being also configured to send the control instruction, where the user behavior is used for representing a user emotion, and the emotion prediction network is obtained by training through an algorithm based on an attention mechanism; and a lamp device connected with the router, where the lighting modes of the lamp device may be modulated arbitrarily, and the lamp device is configured to receive the control instruction from the router and control the lighting mode according to the control instruction.

An embodiment according to a fourth aspect of the present disclosure provides a lighting control system, including: a controller configured to acquire a user behavior, input the user behavior into an emotion prediction network for prediction to obtain an emotion classification result, generate a control instruction according to the emotion classification result and send the control instruction, where the user behavior is used for representing a user emotion, and the emotion prediction network is obtained by training through an algorithm based on attention mechanism; and a lamp device connected with the controller, where the lighting modes of the lamp device may be modulated arbitrarily, and the lamp device is configured to receive the control instruction and control the lighting mode according to the control instruction.

An embodiment according to a fifth aspect of the present disclosure provides a computer storage medium storing instructions executable by a processor which, when executed by the processor, cause the processor to perform the steps of the lighting control methods according to any one of the embodiments of the first aspect.

Because the computer storage medium according to the embodiment of the fifth aspect store the instructions that can cause the processor to perform the steps of the lighting control methods according to any one of the embodiments of the first aspect, the computer storage medium has all the beneficial effects of the first aspect of the present disclosure.

Additional aspects and advantages of the present disclosure will be given in part in the following description, and will become apparent in part from the following description, or will be learned through the practice of the present disclosure.

BRIEF DESCRIPTION OF DRAWINGS

The above and/or additional aspects and advantages of the present disclosure will be more apparent from the following description of the embodiments in conjunction with the accompanying drawings, wherein.

DETAILED DESCRIPTION

In the description of the present disclosure, unless otherwise explicitly defined, words such as "set", "install" and "connect", etc. should be understood in a broad sense, and those skilled in the art can reasonably determine the specific meanings of the above words in the present disclosure in combination with the specific contents of the technical solutions. In the description of the present disclosure, the word "several" refers to be one or more, and the word "multiple" refers to be not less than two. The meanings of greater than, less than, more than, etc., are understood as not including this number, while the meanings of above, below, within, etc., are understood as including this number. Therefore, the features defined with "first" and "second" may explicitly or implicitly include one or more of the features. In the description of the present disclosure, unless otherwise stated, the meaning of "multiple" means two or more.

First of all, some terms involved in this application are explained as follow.

Artificial Intelligence (AI) is a new technological science that researches and develops theories, methods, technologies and application systems for simulating, extending and expanding human intelligence. Artificial intelligence is a branch of computer science. Artificial intelligence attempts to understand the essence of intelligence and produce a new intelligent machine that can respond in a similar way to human intelligence. The research in this field comprises robots, language recognition, image recognition, natural language processing and expert systems, or the like. Artificial intelligence can simulate the information process of human consciousness and thinking. Artificial intelligence is also a theory, method, technology and application system that uses digital computers or machines controlled by digital computers to simulate, extend and expand people's intelligence, perceive the environment, acquire knowledge and use knowledge to get the best results.

Natural language processing (NLP) uses computers to process, understand and use human languages (such as Chinese. English, or the like). NLP is a branch of artificial intelligence, an interdisciplinary subject of computer science and linguistics, and is often called computational linguistics. Natural language processing comprises grammar analysis, semantic analysis, text comprehension, or the like. Natural language processing is often used in machine translation, handwritten and printed character recognition, speech recognition and text-to-speech conversion, information retrieval, information extraction and filtering, text classification and clustering, public opinion analysis and opinion mining, or the like, and involves data mining, machine learning, knowledge acquisition, knowledge engineering and artificial intelligence research related to language processing, and linguistic research related to language computing, or the like.

In the related art, in order to adapt to the requirements for different scenarios, some lamp devices for lighting are provided with a plurality of modulable lighting modes, and users can switch the lighting modes of the lamp devices according to usage demands to adapt to the corresponding requirement for scenarios. However, users are required to actively switch the lighting modes of the lamp devices, and the user operation is required for each switching control of the lighting modes, which makes the lighting control in this way cumbersome. In order to reduce the user operation, some lamp devices may switch the lighting modes according to preset solutions, and the lighting modes can only be modulated according to the preset solutions. Although this lighting control can reduce the user operation, it is difficult to make the lighting mode effectively meet the lighting usage demands of the actual scene.

Based on this, in order to reduce the user operation and make the lighting mode effectively adapt to the lighting usage demands of the actual scene, the present disclosure combines artificial intelligence to analyze an obtained user behavior to obtain a control instruction, and controls the lighting mode of the lamp device to adapt to the user emotion.

Referring to FIG. 1 to FIG. 6, a lighting control method, a control system and a storage medium of the present disclosure are described below, which can determine a control instruction for controlling a lamp device by acquiring a user behavior, where a lighting mode of the lamp device corresponding to the control instruction is matched with the user emotion, so that the user experience can be improved.

The embodiment according to the first aspect of the present disclosure describes a lighting control method, and the embodiment of the application can acquire and process related data based on artificial intelligence, which is a theory, method, technology and application system that uses digital computers or machines controlled by digital computers to simulate, extend and expand artificial intelligence, perceive the environment, acquire knowledge and use knowledge to get the best results.

Figure 1:
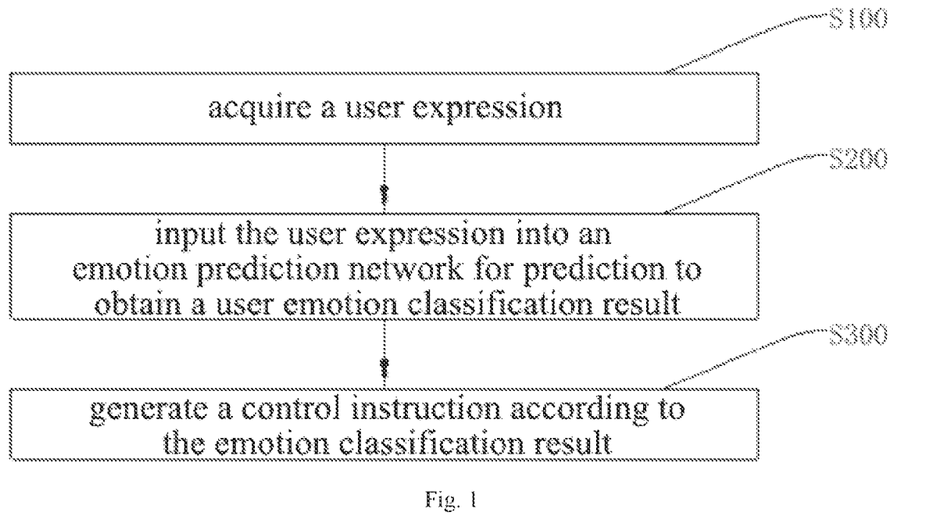
FIG. 1 is a flowchart of main steps of a lighting control method according to an embodiment of the present disclosure.

Referring to FIG. 1, the embodiment according to the first aspect of the present disclosure provides a lighting control method, and the control method comprises, but is not limited to the following steps.

In a step of S100, a user behavior representing a user emotion is acquired.

In a step of S200, the user behavior is input into an emotion prediction network, which is obtained by training through an algorithm based on an attention mechanism, for prediction to obtain a user emotion classification result.

In a step of S300, a control instruction is generated according to the emotion classification result, and used for modulating a lighting mode of at least one lamp device 2000.

The user emotion classification result is obtained by analyzing and predicting the user behavior, the control instruction is generated according to the emotion classification result. The control instruction is used for modulating the lighting mode of the lamp device 2000, so that the lamp device 2000 modulates the lighting mode according to the control instruction to match with the user emotion implied in the user behavior, thereby improving the user experience and realizing the intelligent control of the lighting mode.

It may be understood that the user behavior is an indirect control instruction expression, which is voice expression data or emotional-expression data or body expression data that implies the user emotion. The voice expression data that implies the user emotion may be, for example, user voice, such as passing an exam, being sad, or the like. The emotional-expression data that implies the user emotion may be a captured picture of the user facial expressions, such as smiling, crying, and the like. The body expression data that implies the user emotion may be a captured picture of the user body language, such as pointing fingers to the lamp device 2000, specific gesture actions, or other specific gestures.

It may be understood that when an analysis system comprises a mobile terminal 1100 and a specific cloud 1200, the mobile terminal 1100 is connected with the specific cloud 1200 through telecommunication, and the mobile terminal 1100 is also connected with the lamp device 2000 through telecommunication. The lighting control method is as follows: the mobile terminal 1100 acquires the user behavior and sends the user behavior to the specific cloud 1200 through telecommunication; the specific cloud 1200 receives the user behavior from the mobile terminal 1100, inputs the user behavior into the emotion prediction network for prediction to obtain the user emotion classification result, and generates the control instruction according to the emotion classification result, and the specific cloud 1200 sends the control instruction to the lamp device 2000 through telecommunication, so that the lamp device 2000 can control the lighting mode according to the received control instruction.

Figure 2:
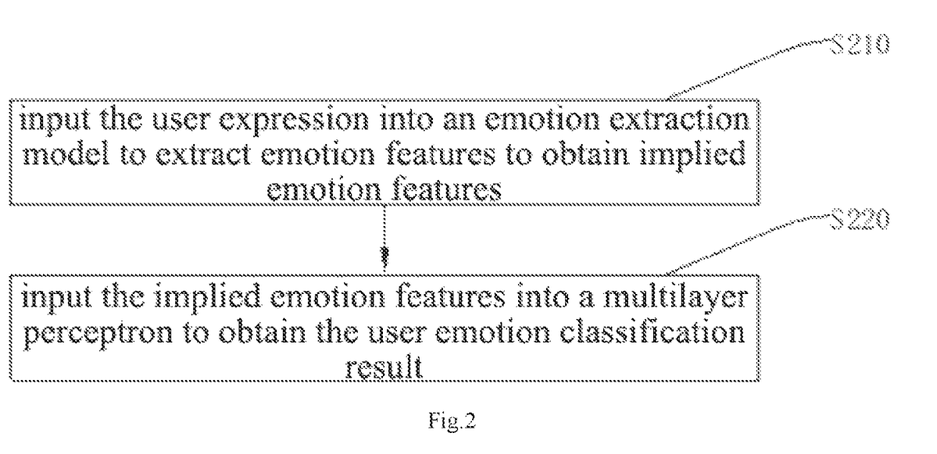
FIG. 2 is a flowchart of sub-steps of step S200 in FIG. 1.

It may be understood that, with reference to FIG. 2, the step of inputting the user behavior into the emotion prediction network for prediction to obtain the user emotion classification result in the step of S200 comprises, but is not limited to the following steps.

In a step of S210, the user behavior is input into an emotion extraction model to extract emotion features to obtain implied emotion features, where the emotion extraction model is obtained by training through an algorithm based on a self-attention mechanism, and the emotion extraction model is capable of extracting the implied emotion features according to the user behavior.

In a step of S220, the implied emotion features are input into a multilayer perceptron to obtain the user emotion classification result that is matched with the user emotion corresponding to the user behavior.

It should be noted that when the user behavior is input into the emotion extraction model, because the user behavior is original data such as voice and image, these original data are first converted into sequence data that can be recognized by the emotion extraction model through preprocessing. In an embodiment, if the user behavior is voice expression data, the data is generally sequence data which can be directly recognized by the emotion extraction model. In another embodiment, if the user behavior is a captured picture of facial expression or body language, the data is generally matrix data which is required to be converted into sequence data, thereby being recognized by emotion extraction model after preprocessing.

When the user behavior is input into the emotion prediction network, it is determined whether the user behavior belongs to special emotions, such as happiness, anger, sadness, fear, or the like. When the user behavior belongs to the special emotions, the user behavior is a special expression. Rather, when the user behavior does not belong to the special emotions, the user behavior is a normal expression representing no special voice, no special expression, no special actions, or the like.

In an embodiment, the result provided by the multilayer perceptron may be the user emotion classification, additionally or alternatively, the direct control instruction that matches the user behavior.

Figure 3:
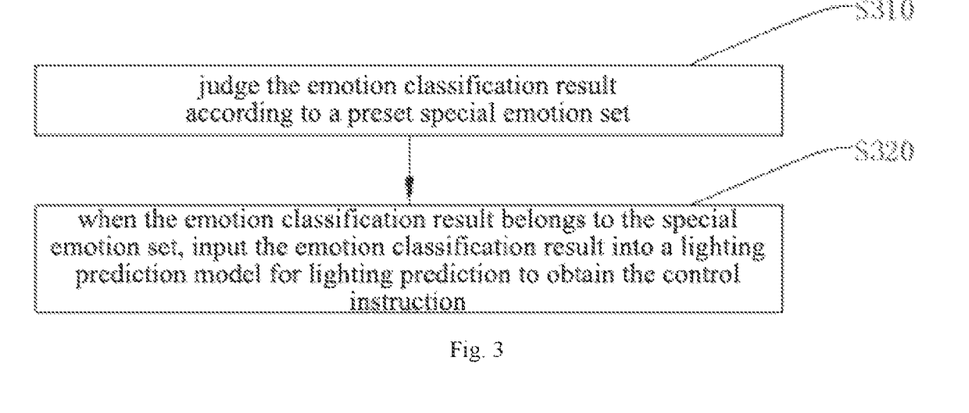
FIG. 3 is a flowchart of sub-steps of step S300 in FIG. 1.

It may be understood that, with reference to FIG. 3, the step of generating the control instruction according to the emotion classification result in step S300 comprises, but is not limited to the following steps.

In a step of S310, it is determined whether the emotion classification result belongs to the special emotion set, i.e., the user behavior is a special expression, according to a preset special emotion set.

In a step of S320, when the emotion classification result belongs to the special emotion set, the emotion classification result is input into a lighting prediction model for lighting prediction to obtain the control instruction.

It may be understood that the user behavior is first converted into the sequence data. Then the sequence data is input into the emotion extraction model to extract the feature to obtain the implied preference features. The emotion extraction model is trained by using a transformer model as a framework. The implied emotion features may represent a relationship between the original data corresponding to the sequence data and a channel. The implied emotion features are input into the multilayer perceptron to obtain a plurality of emotion classification results. The plurality of emotion classification results are input into the lighting prediction model for prediction to obtain the control instruction obtained by integrating the analysis and prediction of the plurality of emotion classification results.

It should be noted that after the implied emotion is input to the multilayer perceptron, the implied emotion is activated by an activation function used for probability calculating, thereby getting the probabilities of various emotions manifested by the user. Because human emotions are complex, i.e., the user may have a plurality of emotions at the same time, a threshold value is set for determining the emotion. The probabilities corresponding to various emotions are compared with the threshold value. When the probability of the emotion exceeds the threshold value, it is determined that the user is in the corresponding emotion at the current moment. All emotions with probabilities exceeding the threshold value form the emotion classification result, so the emotion classification result is usually a multi-label result.

In order to help users who lack relevant professional knowledge such as lighting design and color psychology to get good lighting experience, the lighting prediction model in the step S320 is generated by the following way: setting a corresponding training set according to the relevant knowledge of lighting design and color psychology, and training to obtain the lighting prediction model by using a neural network based on an attention mechanism as a framework. The lighting prediction model is a neural network model based on lighting design and color psychology analysis, which can analyze the emotion classification result to obtain the corresponding lighting effect, and determine the corresponding control instruction according to the lighting effect to realize output. The lighting mode formed by the lamp device according to the control instruction is adapted with the user emotion.

Figure 4:
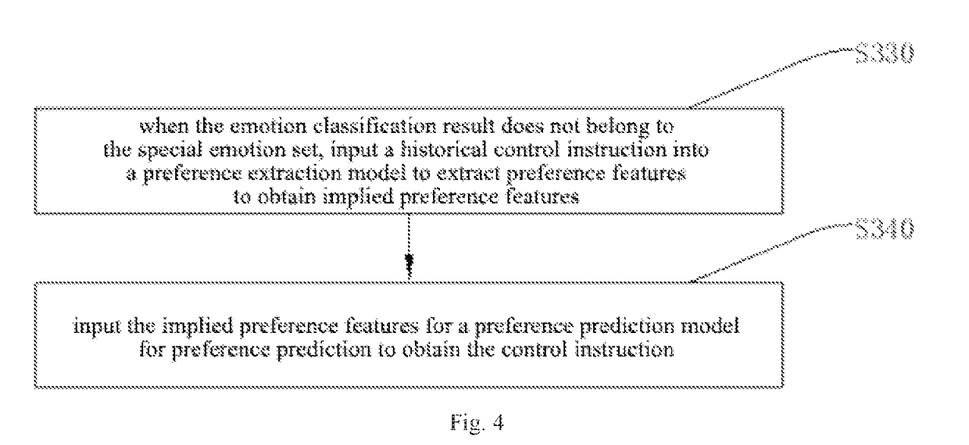
FIG. 4 is a flowchart of steps after step S310 in FIG. 3.

It may be understood that, with reference to FIG. 4, after determining the emotion classification result according to the preset special emotion set in the step 310, the method further comprises, but is not limited to the following steps.

In a step of S330, when the emotion classification result does not belong to the special emotion set, a historical control instruction is input into a preference extraction model to extract preference features to obtain implied preference features. That is, the user behavior is a normal expression, and the preference extraction model is obtained by training through an algorithm based on a self-attention mechanism.

In a step of S340, the implied preference features are input into a preference prediction model for preference prediction to obtain the control instruction.

According to the historical control instruction of the user, a lighting preference of the user is obtained by calculating and a corresponding control instruction is formed. When the user behavior is a normal expression, the lighting mode of the lamp device 2000 can be controlled to match with the user preference.

It may be understood that when the user behavior is a normal expression, the historical control instruction corresponding to the historical lighting mode of the lamp device 2000 is sorted into sequence data, and the sequence data is input into the preference extraction model for feature extraction to obtain the implied preference features. The preference extraction model is trained by using the transformer model as a framework. The implied preference features are input into the preference prediction model for prediction to obtain the control instruction. The preference prediction model is obtained by training through an algorithm based on an attention mechanism.

It may be understood that the control instruction comprises light color data and color rhythm data.

It should be noted that the control instruction may further comprise light brightness in addition to the light color data and the color rhythm data.

Figure 5:
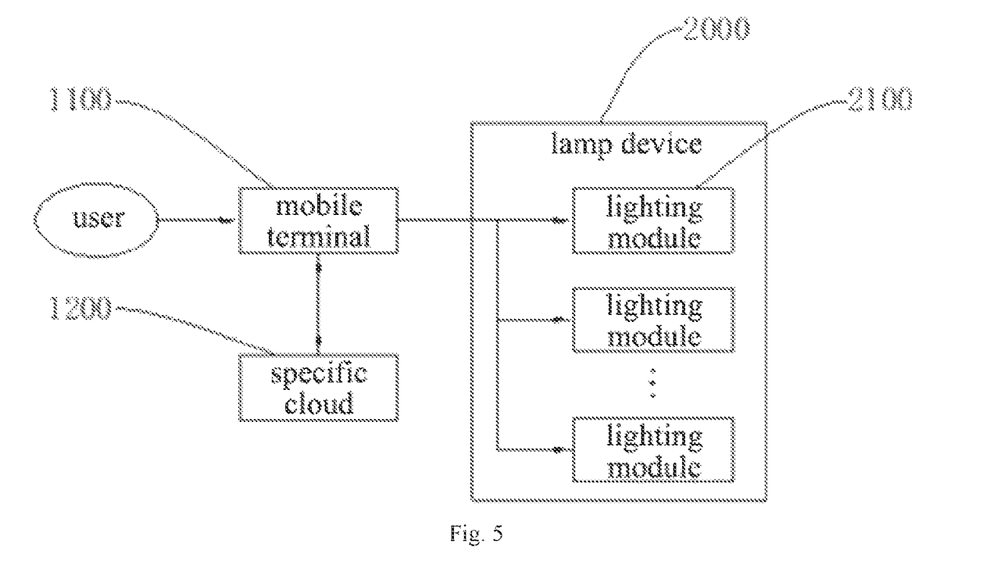
FIG. 5 is a schematic structural diagram of a lighting control system according to an embodiment of the present disclosure.

With reference to FIG. 5, a lighting control system according to the embodiment of the second aspect of the present disclosure comprises an analysis system and a lamp device 2000. The analysis system comprises a mobile terminal 1100 and a specific cloud 1200 connected with each other. The mobile terminal 1100 is configured to receive a user behavior and send the user behavior to the specific cloud 1200. The specific cloud 1200 is configured to input the received user behavior into an emotion prediction network for prediction to obtain an emotion classification result, generate a control instruction according to the emotion classification result and send the control instruction to the mobile terminal 1100. The mobile terminal 1100 is also configured to send the control instruction. The user behavior is used for representing a user emotion, and the emotion prediction network is obtained by training through an algorithm based on an attention mechanism. The lamp device 2000 is connected with the mobile terminal 1100. The lamp device has a plurality of modulable light modes. The lamp device 2000 is configured to receive the control instruction from the mobile terminal 1100 and control the lighting mode according to the control instruction.

The lighting mode of the lamp device 2000 can be intelligently controlled by connecting and controlling the lamp device 2000 through the analysis system. The user behavior which can reflect the user emotion can be automatically monitored by the analysis system. The user behavior can be predicted by the emotion prediction network, so that the control instruction matched with the user emotion can be obtained. The analysis system sends the control instruction to the lamp device 2000, so that the lamp device 2000 can be controlled to be modulated to the lighting mode which is matched with the user emotion according to the received control instruction. Therefore, the modulating control effect of the lighting mode is good, and the control operation is intelligent, simple and convenient.

It may be understood that the analysis system monitors the users through voice, video and other interactive ways, so as to obtain the user behavior that can reflect the user emotion.

It may be understood that, with reference to FIG. 5, the mobile terminal 1100 is respectively connected with the specific cloud 1200 and the lamp device 2000 by means of telecommunication. The mobile terminal 1100 is configured to receive the user behavior and send the user behavior to the specific cloud 1200. The specific cloud 1200 is configured to receive the user behavior, make corresponding analysis according to the user behavior to obtain the control instruction and send the control instruction to the mobile terminal 1100. The mobile terminal 1100 is also configured to receive the control instruction and send the control instruction to the lamp device 2000. The information exchange between the mobile terminal 1100 and the specific cloud 1200 and the information exchange between the mobile terminal 1100 and the lamp device 2000 can be realized by means of telecommunication, which can effectively reducing the use of wiring, thereby effectively simplifying the structural complexity of the lighting control system. The mobile terminal 1100 may be a mobile terminal device, a camera device, a visual doorbell or door lock, or other devices with voice recording and image recording functions, so as to ensure that the user behavior that can reflect the user emotion can be obtained. The user behavior may be voice expressions, emotional-expressions, or body expressions.

The visible doorbell or door lock can identify identity information of the user through the acquired image, and can match the historical control instruction of the user. After the historical control instruction is input into the preference extraction model to extract the preference features to obtain the implied preference features, the implied preference features are then input into the preference prediction model for preference prediction to obtain a new control instruction. The lamp device 2000 can control the corresponding lighting mode according to the new control instruction to match a usage habit of the corresponding user.

It may be understood that the mobile terminal 1100 is connected with the specific cloud 1200 and the lamp device 2000 through network or Bluetooth, respectively. Telecommunication is realized by setting corresponding network communication modules or Bluetooth communication modules in the mobile terminal 1100, the specific cloud 1200 and the lamp device 2000.

It may be understood that, with reference to FIG. 5, the lamp device 2000 comprises a plurality of lighting modules 2100, each of which is connected with the analysis system. The analysis system sends the control instruction to each lighting module 2100, which then receives the control instruction and controls to modulate to the corresponding lighting mode, thereby forming a lighting effect adapted to the user emotion.

Figure 6:
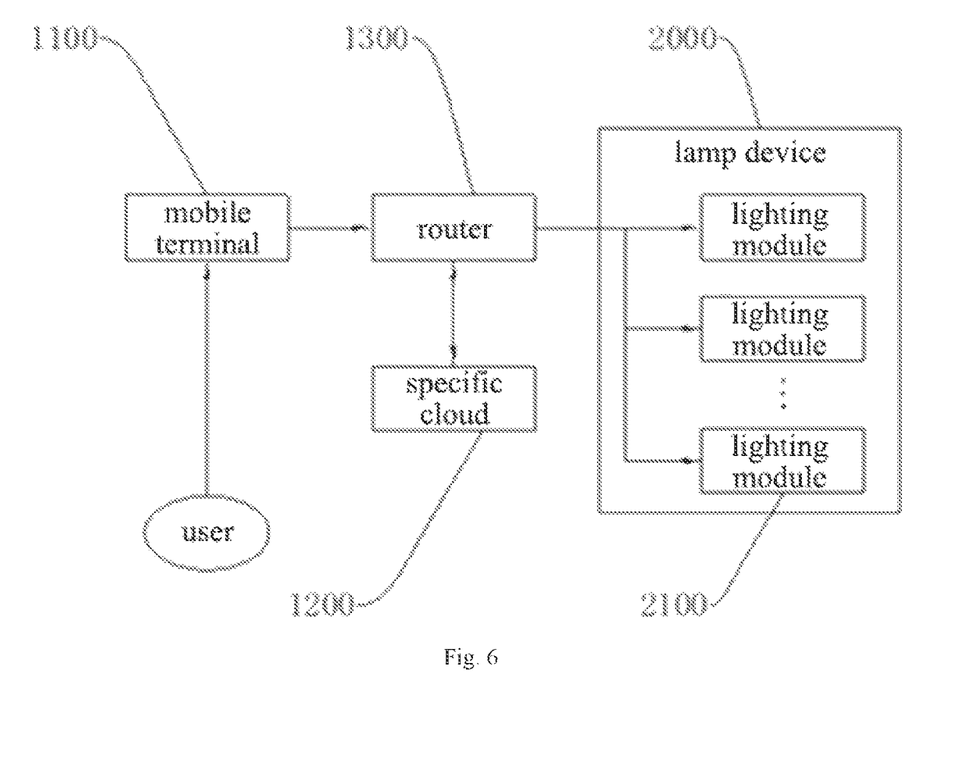
FIG. 6 is a schematic structural diagram of a lighting control system according to another embodiment of the present disclosure.

With reference to FIG. 6, a lighting control system according to the embodiment of the third aspect of the present disclosure comprises an analysis system and a lamp device 2000. The analysis system comprises a mobile terminal 1100, a specific cloud 1200 and a router 1300. The mobile terminal 1100 is connected with the router 1300, which is in turn connected with the specific cloud 1200. The mobile terminal 1100 is configured to receive a user behavior and send the user behavior to the router 1300. The router 1300 is configured to send the user behavior to the specific cloud 1200, which is configured to input the received user behavior into an emotion prediction network for prediction to obtain an emotion classification result, generate a control instruction according to the emotion classification result and send the control instruction to the router 1300. The router 1300 is also configured to send the control instruction fed back by the specific cloud 1200. The user behavior is used for representing a user emotion, and the emotion prediction network is obtained by training through an algorithm based on an attention mechanism. The lamp device 2000 is connected with the router 1300. The lamp device 2000 has a plurality of modulable lighting modes. The lamp device 2000 is configured to receive the control instruction from the router 1300 and control the lighting mode according to the control instruction.

It may be understood that, with reference to FIG. 6, the lamp device 2000 comprises a plurality of lighting modules 2100, each of which is connected with the analysis system. The analysis system sends the control instruction to each lighting module 2100, which then receives the control instruction and controls to modulate to the corresponding lighting mode, thereby forming a lighting effect adapted to the user emotion.

A lighting control system according to the embodiment of the fourth aspect of the present disclosure comprises a controller and a lamp device 2000. The controller is configured to acquire a user behavior, input the user behavior into an emotion prediction network for prediction to obtain an emotion classification result, generate a control instruction according to the emotion classification result and send the control instruction. The user behavior is used for representing a user emotion, and the emotion prediction network is obtained by training through an algorithm based on attention mechanism. The lamp device 2000 is connected with the controller. The lamp device 2000 has a plurality of modulable lighting mode. The lamp device 2000 is configured to receive the control instruction and control the lighting mode according to the control instruction.

The lighting mode of the lamp device 2000 can be intelligently controlled by connecting and controlling the lamp device 2000 through the controller. The user behavior which can reflect the user emotion can be automatically monitored by the controller, and predicted by the emotion prediction network, so that the control instruction matched with the user emotion can be obtained. The controller is configured to send the control instruction to the lamp device 2000, so that the lamp device 2000 can be controlled to be modulated to the lighting mode which is matched with the user emotion according to the received control instruction. Therefore, the modulating control effect of the lighting mode is good, and the control operation is intelligent, simple and convenient.

Moreover, an embodiment according to a fifth aspect of the present disclosure further provides an electronic device comprising: a memory, a processor and a computer program stored in the memory and executable by the processor.

The processor and the memory may be connected with each other by a bus or other means.

As a non-transient computer-readable storage medium, the memory may be used to store non-transient software programs and non-transient computer-executable programs. In addition, the memory may comprise a high-speed random access memory, and may also comprise a non-transitory memory, such as at least one disk memory device, a flash memory device, or other non-transitory solid state memory device. In some embodiments, the memory may optionally comprise memories remotely located with respect to the processor, and these remote memories may be connected to the processor via networks. Examples of the networks above comprise, but are not limited to, the Internet, intranet, local area networks, mobile communication networks, and combinations thereof.

Non-transient software programs and instructions required to implement the lighting control method of the embodiment according to the first aspect above are stored in the memory which, when executed by the processor, cause the processor to perform the lighting control method of the above embodiment, for example, the above-described method steps S100 to S300, method steps S210 to S220, method steps S310 to S320 and method steps S330 to S340.

The device embodiments described above are only illustrative, where the units that are described as separate components may or may not be physically separated, i.e., may be located in one place or distributed to a plurality of network units. Some or all of modules may be selected according to actual needs to achieve the purpose of the technical solution in the embodiment.

Moreover, an embodiment according to a sixth aspect of the present disclosure provides a computer-readable storage medium. The computer-readable storage medium stores a computer-executable instruction. The computer-executable instruction is executed by a processor or controller, for example, the processor in the above-mentioned device embodiment, so that the above-mentioned processor can perform the lighting control method in the above-mentioned embodiment, for example, the above-described method steps S100 to S300, method steps S210 to S220, method steps S310 to S320, and method steps S330 to S340.

Those of ordinary skills in the art will appreciate that all or some of the steps and systems in the methods disclosed above may be implemented as software, firmware, hardware, and suitable combinations thereof. Some or all of the physical components may be implemented as software executed by a processor, such as a central processing unit, a digital signal processor or a microprocessor, or implemented as hardware, or implemented as an integrated circuit, such as an application specific integrated circuit. Such software may be distributed on a computer-readable medium, which may comprise a computer storage medium (or non-transitory medium) and a communication medium (or transitory medium). As well known to those of ordinary skills in the art, the term "computer storage medium" comprises volatile and non-volatile, removable and non-removable media implemented in any method or art for storing information (such as computer-readable instruction, data structure, programming module or other data). The computer storage medium comprises, but is not limited to, RAM, ROM, EEPROM, flash memory or other memory technology. CD-ROM, digital versatile disc (DVD) or other optical disc memory, magnetic cassette, magnetic tape, magnetic disk memory or other magnetic memory device, or may be any other medium that can be used to store the desired information and can be accessed by a computer. Moreover, it is well known to those of ordinary skills in the art that the communication medium typically comprises computer-readable instructions, data structures, program modules, or other data in a modulated data signal, such as a carrier wave or other transmission mechanism, and may comprise any information delivery medium.

In the description of this specification, the descriptions to the reference terms "one embodiment". "some embodiments", "illustrative embodiments", "examples", "specific examples" or "some examples" mean that the specific features, structures, materials or characteristics described in connection with this embodiment or example are included in at least one embodiment or example of the embodiments. In the specification, the schematic representation of the above terms does not necessarily mean the same embodiment or example. Moreover, the specific features, structures, materials or characteristics described may be combined in any one or more embodiments or examples in a suitable manner.

Although the embodiments of the present disclosure have been shown and described, those of ordinary skills in the art should understand that various changes, amendments, substitutions and modifications can be made to these embodiments without departing from the principles and purposes of the present disclosure, and the scope of the present disclosure is limited by the claims and equivalents thereof.

What is claimed is:

1. A lighting control method, comprising:
   acquiring a user behavior representing a user emotion;
   inputting the user behavior into an emotion prediction network for prediction to obtain a user emotion classification result, wherein the emotion prediction network is obtained by training through an algorithm based on an attention mechanism; and
   generating a control instruction according to the emotion classification result, wherein the control instruction is used for modulating a lighting mode of at least one lamp device.

2. The lighting control method according to claim 1, wherein the user behavior is user voice data, user emotional-expression data, or user gesture data.

3. The lighting control method according to claim 1, wherein inputting the user behavior into the emotion prediction network for prediction to obtain the user emotion classification result comprises:
   inputting the user behavior into an emotion extraction model to extract emotion features to obtain implied emotion features, wherein the emotion extraction model is obtained by training through an algorithm based on a self-attention mechanism.

4. The lighting control method according to claim 3, wherein after inputting the user behavior into an emotion extraction model to extract emotion features to obtain implied emotion features, the method further comprises:
   inputting the implied emotion features into a multilayer perceptron to obtain the user emotion classification result.

5. The lighting control method according to claim 1, wherein generating the control instruction according to the emotion classification result comprises:
   determining the emotion classification result according to a preset special emotion set; and
   in response to the emotion classification result belonging to the special emotion set, inputting the emotion classification result into a lighting prediction model for lighting prediction to obtain the control instruction.

6. The lighting control method according to claim 1, wherein after determining the emotion classification result according to the preset special emotion set, the method further comprises:
   in response to the emotion classification result not belonging to the special emotion set, inputting a historical control instruction into a preference extraction model to extract preference features to obtain implied preference features, wherein the preference extraction model is obtained by training through an algorithm based on a self-attention mechanism; and
   inputting the implied preference features into a preference prediction model for preference prediction to obtain the control instruction.

7. A lighting control system, comprising:
   an analysis system, comprising a mobile terminal and a specific cloud connected with each other, the mobile terminal being configured to receive a user behavior and send the user behavior to the specific cloud, the specific cloud being configured to input the received user behavior into an emotion prediction network for prediction to obtain an emotion classification result, generate a control instruction according to the emotion classification result and send the control instruction to the mobile terminal, the mobile terminal being also configured to send the control instruction; wherein the user behavior is used for representing a user emotion, and the emotion prediction network is obtained by training through an algorithm based on an attention mechanism; and
   a lamp device connected with the mobile terminal, wherein a plurality of lighting modes of the lamp device is configured to be modulable, and the lamp device is configured to receive the control instruction from the mobile terminal and control the plurality of lighting mode according to the control instruction.

8. The lighting control system according to claim 7, wherein the mobile terminal is respectively connected with the specific cloud and the lamp device by means of telecommunication.

9. A lighting control system, comprising:
   a controller configured to acquire a user behavior, input the user behavior into an emotion prediction network for prediction to obtain an emotion classification result, generate a control instruction according to the emotion classification result and send the control instruction, wherein the user behavior is used for representing a user emotion, and the emotion prediction network is obtained by training through an algorithm based on attention mechanism; and
   a lamp device connected with the controller, wherein the lamp device comprises a plurality of modulable lighting modes, and the lamp device is configured to receive the control instruction and control the lighting mode according to the control instruction.

10. A computer storage medium storing a computer-executable instruction executable by a processor which, when executed by the processor, causes the processor to perform the lighting control method according to claim 1.

11. The computer storage medium according to claim 10, wherein the user behavior is user voice data, user emotional-expression data, or user gesture data.

12. The computer storage medium according to claim 10, wherein inputting the user behavior into the emotion prediction network for prediction to obtain the user emotion classification result comprises:
inputting the user behavior into an emotion extraction model to extract emotion features to obtain implied emotion features, wherein the emotion extraction model is obtained by training through an algorithm based on a self-attention mechanism.

13. The computer storage medium according to claim 12, wherein after inputting the user behavior into an emotion extraction model to extract emotion features to obtain implied emotion features, the method further comprising:
inputting the implied emotion features into a multilayer perceptron to obtain the user emotion classification result.

14. The computer storage medium according to claim 10, wherein generating the control instruction according to the emotion classification result comprises:
determining the emotion classification result according to a preset special emotion set; and
in response to the emotion classification result belonging to the special emotion set, inputting the emotion classification result into a lighting prediction model for lighting prediction to obtain the control instruction.

15. The computer storage medium according to claim 10, wherein after determining the emotion classification result according to the preset special emotion set, the method further comprises:
in response to the emotion classification result not belonging to the special emotion set, inputting a historical control instruction into a preference extraction model to extract preference features to obtain implied preference features, wherein the preference extraction model is obtained by training through an algorithm based on a self-attention mechanism; and
inputting the implied preference features into a preference prediction model for preference prediction to obtain the control instruction.

* * * * *